United States Patent [19]

Walsh

[11] Patent Number: 5,167,505
[45] Date of Patent: Dec. 1, 1992

[54] EDUCATIONAL AIDES AND METHODS

[76] Inventor: Bonnie J. Walsh, 261 Midvale St., Ridgewood, N.J. 07450

[21] Appl. No.: 616,433

[22] Filed: Nov. 21, 1990

[51] Int. Cl.5 .............................................. G09B 1/16
[52] U.S. Cl. .................................. 434/205; 434/207; 434/200
[58] Field of Search ............... 434/190, 200, 205, 207, 434/208, 188

[56] References Cited

U.S. PATENT DOCUMENTS

| | | | |
|---|---|---|---|
| 1,244,000 | 10/1917 | Soltoft | 434/207 X |
| 1,664,808 | 4/1928 | Cooper . | |
| 2,014,675 | 9/1935 | Webster | 434/207 X |
| 2,304,893 | 12/1942 | Dickson | 434/200 |
| 2,372,799 | 4/1945 | Smith . | |
| 3,311,996 | 4/1967 | Bergener | 434/207 |
| 3,624,686 | 11/1971 | Beals . | |
| 3,837,096 | 9/1974 | Sterling | 434/205 X |
| 4,317,515 | 3/1982 | Feeley et al. . | |
| 4,518,358 | 5/1985 | Mather . | |
| 5,066,234 | 11/1991 | Le Desma | 434/207 X |

FOREIGN PATENT DOCUMENTS 529461 11/1940 United Kingdom ................ 434/207

Primary Examiner—Richard J. Apley
Assistant Examiner—Karen A. Richard
Attorney, Agent, or Firm—Lerner, David, Littenberg, Krumholz & Mentlik

[57] ABSTRACT

An educational aid and educational method for teaching pattern recognition and numerical skills to young children. The aid includes plural groups of game pieces each incorporating a different number of game pieces, the game pieces in different groups bearing different indicia such as different colors. The child matches the game pieces to matching target areas in a series of matching operations requiring progressively higher levels of abstract reasoning, ranging from simple color matching to matching the number of pieces to a numeral. The matching target areas may be defined on a substrate and on a series of auxiliary matching targets, each associated with one group of game pieces. The game pieces may be attached to the auxiliary matching targets and the resulting assemblies may then be matched to matching target areas on the substrate.

27 Claims, 2 Drawing Sheets

EDUCATIONAL AIDES AND METHODS

BACKGROUND OF THE INVENTION

The present invention relates to educational aids and methods for teaching mathematical and pattern recognition skills to young children.

Even the simplest elements of mathematics as used by adults incorporate significant abstract concepts. For example, the simple operation of counting the items in two groups of items to determine which group has more items implicitly requires understanding of abstract ideas such as what is meant by a number and the concept that one number can be greater or less than another. Likewise, the statement that one group of items includes 8 items requires understanding of the concept that the symbol "8" stands for a particular number and some concept of where that number lies in the order of numbers, i.e., that the number eight is more than seven but less than nine. These concepts are so rudimentary that adults typically employ them without conscious thought, and without ever considering that they have learned these concepts.

These concepts are not inborn, but in fact must be learned by each child during his or her development, typically at the age of about three years to about five years. The child must master these concepts before he or she can begin to grasp more complex ideas such as addition and subtraction. Because the children studying these rudimentary concepts are so young, they typically have very limited attention spans. Educational aids for use with this age group should have features which inherently attract the child's attention. They should constantly challenge the child without presenting a task which is too difficult for the child, leading to frustration and resentment. Thus it is important to present concepts progressively, continually building upon concepts which have previously been taught. Moreover, educational aids should be inexpensive, durable and safe. They should be simple in concept and in execution so that the teacher can concentrate on teaching rather than on operating the aid.

All of these requirements taken together present a formidable problem. Although considerable effort and expense have been devoted to development of educational aids and teaching methods, there has been a substantial need, prior to the present invention, for still further improvements in educational aids for teaching basic mathematical and pattern recognition concepts, and a corresponding need for improvements in methods of teaching these concepts.

SUMMARY OF THE INVENTION

The present invention addresses these needs.

One aspect of the present invention provides an educational aid including a plurality of groups of game pieces, each such group including a different number of game pieces. Typically ten groups of game pieces are provided, the first such grouping including one piece, the second, two pieces, and so on through the tenth group which includes ten pieces. The game pieces, also referred to as "manipulatives", may have indicia on them. The game pieces in each group have the same indicia, whereas the game pieces in different groups have different indicia. The indicia on the game pieces may be as simple as the color of the game pieces, a particular color being associated with each group such that all of the pieces in each group are of the same color whereas pieces in other groups are of other colors. The educational aid includes at least one matching target defining a plurality of matching target areas, each such matching target area being associated with one of the groups of game pieces. Each matching target area has indicia thereon denoting the associated group of game pieces. The indicia on the various matching target areas most preferably include indicia at several different levels of abstraction. For example, the indicia on the matching target areas may include colors corresponding to the colors for the various groups of game pieces, and may also include sets of marks, the number of marks in each such set corresponding to one of the game pieces in one of the groups. The indicia on the matching target areas may further include numerals denoting the numbers of game pieces in the various groups.

The matching target areas and the game pieces desirably are constructed and arranged so that the game pieces can be positioned on the various matching target areas. Thus at an early learning stage, the child can match game pieces of the various groups to the appropriate matching target areas using colors, which require only a very low level of abstract reasoning. At a higher level the child may associate the various groups with the appropriate matching target areas by matching the quantity of pieces in the various groups to the quantities of marks in the various sets. At a still higher level the child may match to the corresponding numerals.

The matching targets desirably include at least one substrate having a plurality of matching target areas, each with the appropriate indicia. The matching target areas on such a substrate desirably are arranged spatially in an order corresponding to the numerical order in the numbers of pieces in the associated groups. Thus, matching target areas may be arranged such that the matching target area associated with a one-piece group precedes the matching target area associated with a two-piece group, and so on. The matching targets may also include auxiliary matching target pieces formed separately from the substrate. Each such auxiliary matching target may be associated with one group of game pieces and may have indicia thereon associated with only that group of game pieces. Thus, the pieces of each group may be matched to one of the auxiliary matching targets as well as to one of the matching target areas on the substrate. Desirably, the auxiliary matching targets, game pieces and substrate are constructed and arranged so that the game pieces may be positioned either on the auxiliary matching targets or on the matching target areas of the substrate, and so that the auxiliary matching targets, with or without the game pieces thereon, may be positioned on the matching target areas of the substrate. This provides for a unique and particularly instructive multiple step matching procedure, in which the child can first match the pieces of a group to a particular auxiliary matching target and then match that auxiliary target to the appropriate target area of the substrate.

Preferred educational aids according to the invention can provide a series of progressively more challenging experiences to the child, each building upon the skills learned in the previous experience. The education content and play value of the aid do not depend upon any complex mechanical or electronic elements. Accordingly, preferred educational aids according to this aspect of the present invention can be simple and economical.

These and other objects, features and advantages of the present invention will be more readily apparent from the detailed description of the preferred embodiments set forth below, taken in conjunction with the accompanying drawings.

Figure 1:
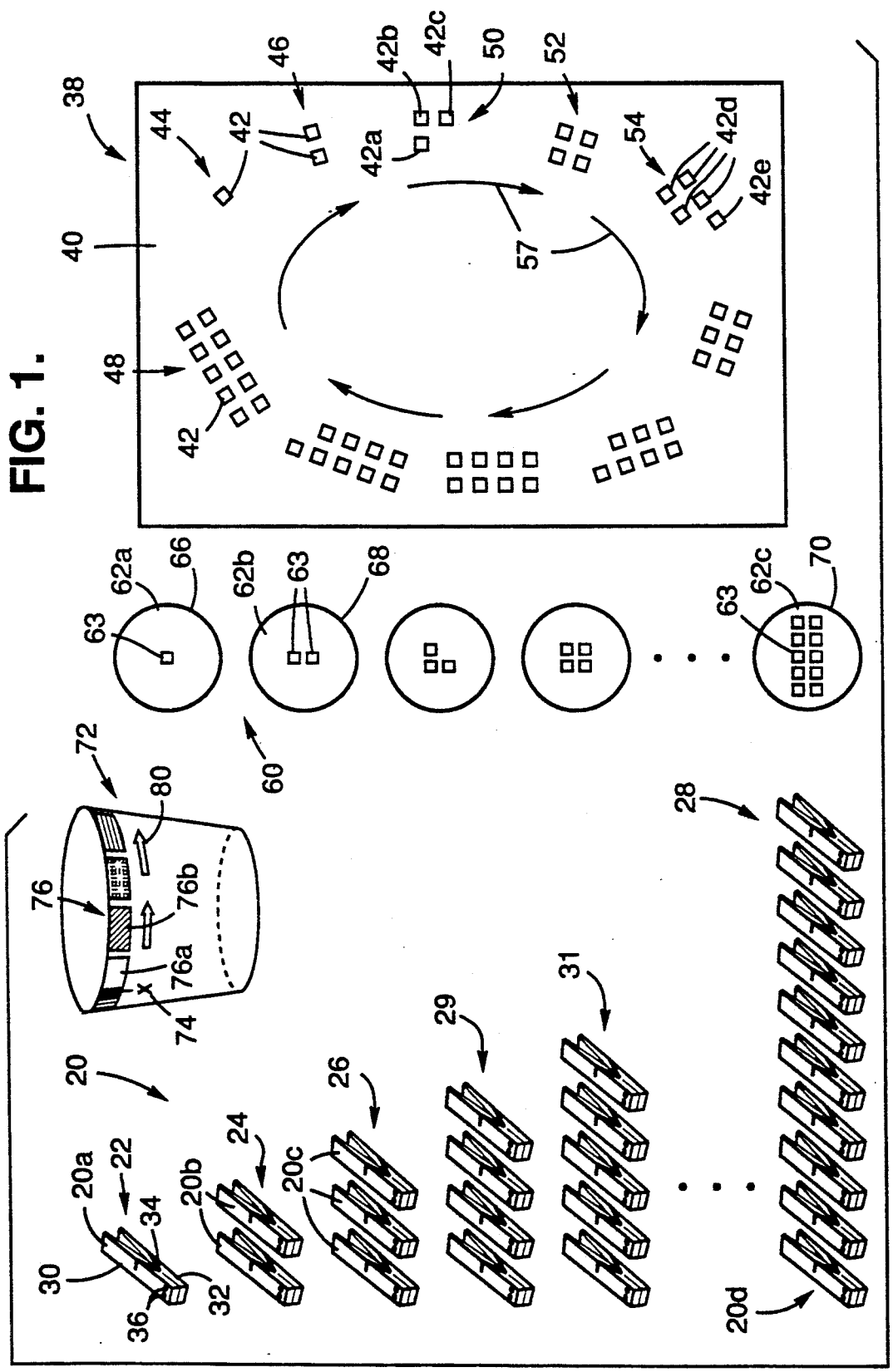
FIG. 1 is a diagrammatic view showing elements of an educational aid in accordance with one embodiment of the present invention.
Figure 2:
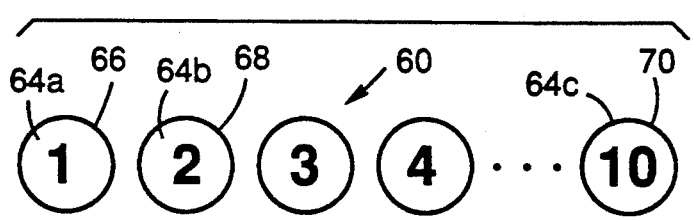
FIG. 2 is a further diagrammatic view showing certain of the elements in the educational aid of FIG. 1, but in a different position.

Each of FIGS. 3, 4, 5, and 6 is a further diagrammatic view illustrating a different step in educational method utilizing the educational aid of FIGS. 1 and 2.

DETAILED DESCRIPTION OF THE PREFERRED EMBODIMENTS

An educational aid in accordance with one embodiment of the present invention includes a plurality of game pieces or manipulatives 20, the game pieces being provided in ten different groups. Each group incorporates a different number of game pieces. The numbers of game pieces in the various groups correspond to the integers 1-10. Thus a first group 22 includes one game piece 20a; and second group 24 includes two game pieces 20b, third group 26 includes three game pieces 20c and so on up through the tenth group 28 which incorporates 10 game pieces 20d. Several of the groups of game pieces, with six through nine game pieces, are omitted from FIG. 1 for clarity of illustration. The game pieces are all of the substantially identical size and shape. As illustrated, each game piece 20 may be a common clothespin having first and second movable elements 30 and 32 and a spring 34 biasing the moveable elements to a normal, closed position. The game pieces desirably are provided with decorations such as simulated eyes 36 so as to make them resemble small animals or "creatures". The game pieces are also provided with indicia in the form of a color covering each game piece except in the area covered by the eyes 36. The colors of the various game pieces are uniform within each group, but each different group of game pieces has a different color. The colors utilized for the various groups as game pieces may be as follows:

TABLE I

| Number of Pieces in Group | Color |
| --- | --- |
| 1 | White |
| 2 | Dark Green |
| 3 | Yellow |
| 4 | Blue |
| 5 | Orange |
| 6 | Black |
| 7 | Purple |
| 8 | Pink |
| 9 | Light Green |
| 10 | Red |

Thus, a particular color is associated with a particular group of game pieces and hence with the particular number of game pieces in that group. For example, white is associated with group 22 having one game piece and with the number 1; dark green is associated with group 24 having two game pieces and so on.

The educational aid further includes a substrate 38 in the form of a flexible cloth mat about 30 cm by about 70 cm. Substrate or mat 38 has a first surface 40, visible in FIG. 1. Surface 40 has 10 matching target areas spaced apart from one another. Each such matching target area is provided with a set of marks 42. The number of marks in such set is a different integer. Thus, a first matching target area 44 has only one mark 42. A second matching target area 46 has two marks and so on, up through a tenth matching target area 48 having 10 marks. Thus, each matching target area on surface 40 is associated with a particular number equal to the number of marks in that matching target area. Each matching target area therefore is associated with the corresponding group of game pieces having that particular number of game pieces. For example, matching target area 44 is associated with the integer one and hence with game piece group 22 having one game piece; matching target area 46 having two marks 42 is associated with the integer two and thus associated with group 24 having two game pieces and so on through matching target area 48 having 10 marks, associated with the number 10 and hence associated with group 28 having 10 game pieces.

The matching target areas on surface 40 of substrate 38 are arranged in numerical order according to the numbers associated with the various matching target areas and hence according to the numbers of marks in the sets of marks within the various matching target areas. Thus, starting from the matching target area 44 associated with the lowest number, movement around the peripheral of surface 40 in the clockwise direction as seen in FIG. 1 encounters matching target areas associated with progressively higher numbers until reaching the highest numbered matching target area 48. Surface 40 is provided with directional indicia in the form of arrows 57 indicating the direction of the ordered arrangement of matching target areas, i.e. the direction from lower to higher areas.

The marks 42 in the various sets are all of uniform size, shape, and color, preferably small squares or circles of a color contrasting with the color of surface 40. Within each set of marks, the marks 42 are arranged in pairs and single marks. Matching target area 44 includes only a single mark 44. The two marks 42 in matching target area 46 are arranged side by side, whereas the three marks 42 in the next matching target area 50 are arranged with one pair of marks 42a and 42b side by side and the third mark 42c standing alone. Next matching target area 52 has two pairs of marks, whereas matching target area 54 associated with the number 5 has two pairs of marks 42d and a single mark 42e standing alone and unpaired. All of the sets of marks 42 with even numbers of marks have all of their marks in pairs, whereas any set of marks including an odd number of marks has one mark standing alone. This pattern facilitates recognition of even and odd numbers. Substrate 38 has a second face (not shown) which does not have marks or other indicia denoting numbers. Both surfaces of the substrate may be decorated to make them interesting to the child. Where the game pieces resemble creatures, the decorations on the substrate may suggest an environment for the creatures, such as a forest or lake.

The educational aid further includes a set of 10 auxiliary matching targets 60, some of which are illustrated in FIG. 1 and FIG. 2. Each auxiliary matching target 60 is a small cloth disk about 10 cm in diameter. Each auxiliary matching target has a first face 62, visible in FIG. 1, and a second face 64, visible in FIG. 2. These faces define additional matching target areas. Each auxiliary matching target is associated with a different integer from 1-10, and thus associated with one of the groups game pieces. The first face 62 of each auxiliary matching targets has a set of marks, the number of marks in such set being equal to the integer associated with the particular matching target. The second face 64 of each auxiliary matching target has a numeral denoting the integer associated with that particular auxiliary matching target. For example, a first auxiliary matching target 66 has one mark 63 on its first face and the numeral "1" on its second face 64a. A second auxiliary matching target 68 has a set of two marks 63 on its first face 62 and has the numeral "2" on its second face 64b. This pattern is consistent with all of the auxiliary matching targets 60, up through the tenth auxiliary matching target 70, associated with the number 10. The tenth target 70 has a set of 10 marks 63 on its first face 62c and has the numeral "10" on its second face 64c.

The educational aid according to the embodiment of the invention further includes an additional substrate 72. Additional substrate 72 is a bucket-like hollow container. When the apparatus is not in use, the other elements can be stored within the container 72. A sequence start mark 74 in the form of a "x" or other distinctive indicia is disposed on the outside of the bucket adjacent the rim at one point of the circumference of the rim. A first matching target area 76a is disposed along the rim of the bucket at sequence start mark 74. Nine further matching target areas 76, of which only some are visible in FIG. 1, are disposed around the circumference of the rim. The various matching target areas 76 are all of different colors, the colors of these matching target areas corresponding to the colors of the game pieces in the various groups. Each matching target area 76 thus is associated with the group of game pieces having the same color. The colors of matching target areas 76 are arranged in an order such that the order of the colors of these matching targets corresponds to the numerical order of the numbers of pieces in the groups of game pieces. Thus, the first matching target 76a has the color (white) associated with the group of game pieces having only one game piece; the next matching target area 76b has the color (dark green) associated with the group of game pieces having two game pieces and so on up through the tenth matching target area which has the color (red) associated with the group of game pieces having ten pieces. Additional substrate 72 has directional indicia such as arrows 80 indicating the direction of the order, i.e. the direction toward areas 76 having colors associated with higher-numbered groups of game pieces. Moving around the circumference of the rim from start mark 74 in the counterclockwise direction indicated by arrows 80 in FIG. 1, one encounters matching target areas having various colors, in the order in which those colors are set forth in table 1 (above).

Completing the educational aid are a collection of instructional cards (not shown) to be used by the teacher. These cards instruct the teacher in the educational method explained in the following paragraphs. Additionally, these cards may contain suggestions as to further expansions of the educational method to which the educational aid can be put.

Figure 3:
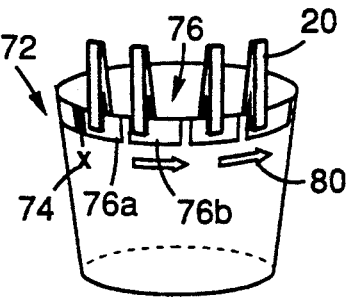

In one educational method according to the invention, the child first is allowed to simply play with the game pieces and familiarize himself or herself with them. Next, the child is asked to attach one game piece (of any group) onto each of the matching target areas 76 of additional substrate 72. In this step, the child is asked to start at the sequence start mark 74 and proceed in a predetermined direction, desirably the predetermined direction indicated by arrows 80. The child is instructed simply to apply one game piece to each matching target area which he encounters, without regard to any particular colors or selection of any particular game pieces or areas. The child clips each game piece to the rim of the additional substrate 72 so that the gripping action of the spring 34 and jaws 30 and 32 of the game piece holds the game piece to the additional substrates as shown in FIG. 3. This step trains the child in the most rudimentary concept of starting a sequence and continuing through that sequence. In addition, this progression, a left to right progression, also emphasizes directionality for reading and instills the habit of beginning at the left and moving to the right. In the next step, the child is asked to perform the same operations again, but this time using particular game pieces which match the particular colors of the matching target areas. This stage of instructions builds upon the rudimentary concept of performing operations in sequence, and adds the concept of matching game pieces to the target areas. As the matching is based upon color, it requires only very low level abstract reasoning processes.

In a further step of the educational method, the substrate 38 is placed on a flat surface such as the floor or a table, with the second, unmarked surface (not shown) facing up. The teacher places the game pieces 20 in the first five groups of game pieces 22, 24, 26, 29, and 31, having 1 through 5 game pieces in each group, on this unmarked surface of substrate 38. The teacher mixes the game pieces in these various groups together, and asks the child to categorize them into groups or "families" according to their colors. Once the child has done this, the teacher asks the child to identify the smallest group and the teacher places that group at the top left hand corner of the substrate. The teacher then asks the child to identify the next larger group, and once that has been identified the teacher places it immediately to the right of the smallest group. This process continues until all five groups have been identified by the child. The same process may be repeated, but this time the child is asked to identify the largest group, containing the most game pieces, and the process proceeds in reverse sequence until the smallest group is reached. In a further step, the child is again asked to separate the game pieces in the first five groups into the individual groups according to colors, but this time the child is now asked to place the groups in order, such as from smallest group to largest group, on the second or unmarked side of substrate 38.

Figure 4:
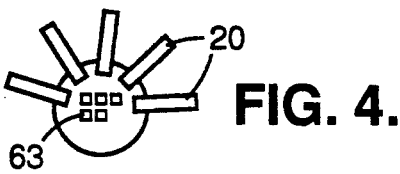

Once the child has arranged the game pieces into these five ordered groups, the child is provided with the auxiliary matching targets 60 associated with the numbers one through five. The first face 62 of each matching target is exposed in this stage, so that the sets of marks 63 on these auxiliary matching targets are visible. The child is then asked to match the auxiliary matching targets with the groups by finding the matching target having the right number of marks for each group. Thus, the child associates the one game piece in group 22 with the first auxiliary matching piece 66; the two game pieces in group 24 with the second matching piece 68 and so on. The child attaches the matching pieces in each group to the auxiliary matching piece by operating the jaws 30 and 32 of the particular game piece, so as to clip the game piece to the periphery of the auxiliary matching piece as illustrated in FIG. 4. The game pieces attached to the auxiliary matching targets do not obscure the marks 63 on the first face of each auxiliary matching targets. In associating the groups of game pieces with the auxiliary matching targets, the child utilizes a somewhat higher level of abstraction than that employed in color matching. Thus, the child is matching groups of game pieces to auxiliary matching pieces by counting and by determining that the count for the group matches the count for the marks. This is known in the education field as "one-to-one correspondence."

Figure 5:
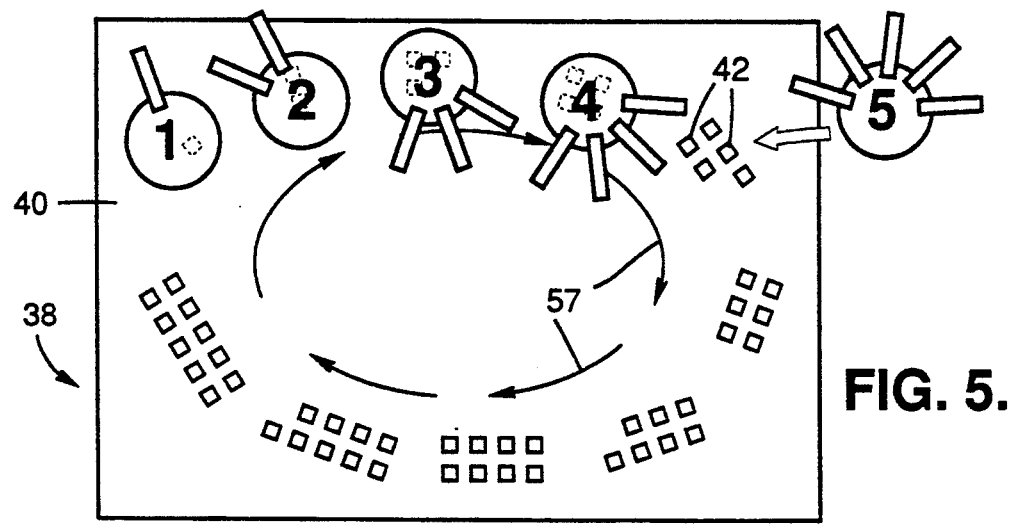

After the game pieces have been attached to the auxiliary matching targets, the assemblies are then used in a further instructional step. The child is given one of the auxiliary matching pieces with the attached game pieces and then asked to count the marks 63 aloud, and to count the number of game pieces aloud. Once the child has done this, the auxiliary matching piece is inverted to show the numeral on the second side, as illustrated in FIG. 5. This effectively communicates to the child the correspondence between the number he has just observed in counting and the numeral.

In a further step of the method, the child utilizes the same five auxiliary matching pieces associated with numbers one through five. The substrate 38 is placed with the first surface 40 facing up as shown in FIG. 5. The child matches the marks 63 on the first surface of each auxiliary matching piece (FIG. 4) with the marks 42 in each of the first 5 matching target areas on substrate 38. The child starts with the first matching target area 44 (FIG. 1) and moves in the predetermined direction of the order indicated by the arrows 57 so that the child encounters matching target areas having progressively larger numbers of marks. As the child matches a particular auxiliary matching piece 60 to one of the matching target areas on the substrate, he or she places the auxiliary matching piece with its second or numeral-bearing face up on the particular matching target area of the substrate, so that each auxiliary target rests upon that matching target area and overlies the marks on the matching target area. This step reinforces the association between numbers of marks and numerals.

Figure 6:
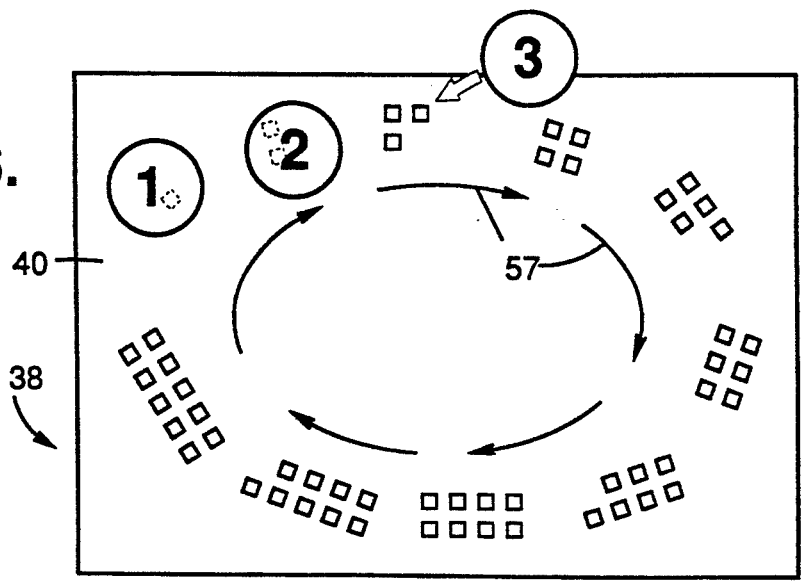

In a further step of the method, the child again sorts the game pieces into groups and again attaches the game pieces in each group to the periphery of the appropriate auxiliary matching target as shown in FIGS. 4 and 5. At this point, the child again matches the auxiliary matching target, with attached game pieces to the matching target area on the first surface 40 of the substrate 38, while the numeral or second face of each auxiliary matching target is face up. In this case, the matching between the auxiliary matching target and the number of marks on each matching target area of the substrate may involve matching the count of game pieces attached to a particular auxiliary matching piece with the number of marks in each set. It may also involve an even higher level of abstraction, viz. Matching the numeral to the number of marks in the set. If desired, the method may include operations wherein the child is asked to match a group of game pieces to an auxiliary matching target using only the numeral, without reference to the set of marks on the matching target. Also, the child may match each auxiliary matching target to a matching target area on substrate 38 with the numeral or second face of the auxiliary matching target face up, without any game pieces as shown in FIG. 6.

If the child has mastered the operations discussed above for the first five groups, with one through five game pieces, the same operations may be repeated using the groups of game pieces and auxiliary matching targets associated with the numbers from six through ten. Once the child has mastered these operations with the higher numbered groups, the same operations can be repeated once again using all of the game pieces and all of the auxiliary matching pieces at once, so that each task involves all numbers from one through ten.

As will be appreciated, the foregoing method takes the child from the simplest concepts of play and color matching through a full understanding of the correspondence between the numerals and the quantities designated by numerals. At the same time, it provides enough varied activities for the child so that the child does not lose interest. Each time the child participates, he or she receives a new experience, different from the earlier steps of the method. Thus, the education aid and educational method according to the invention provide an enjoyable experience for the child which will hold the child's attention. This experience may be enhanced by the decorations on the educational aid. As aforementioned, each of the game pieces desirably is arranged to look like a small animal or "creature". The substrate may be decorated on both sides to resemble a forest or lake in which the creatures reside, whereas the auxiliary matching pieces may be explained to the children as being "islands" upon which the creatures can rest.

Numerous variations and combinations of the features discussed above can be utilized without departing from the present invention as defined by the claims. For example, many different devices can be used to permit attachment of the game pieces to the substrate and/or auxiliary matching pieces. Thus the additional substrate 72 could be provided with snaps or hooks, or other fasteners and the auxiliary matching pieces 60 could likewise be provided with fasteners, and each game piece 20 could be provided with a complimentary fastener to engage the fastener on the substrate or auxiliary matching piece. Magnets can be incorporated in the various elements of the apparatus to permit selective assembly and disassembly. Although the substrate has been illustrated in the preferred embodiment as a flat, sheet-like structure, this configuration is not essential. Merely by way of example, the substrate may comprise an elongated string or rod having various matching target areas disposed along its length, desirably in the order of the associated numbers. In this case, the matching target areas and/or the auxiliary matching targets can be provided with devices to hold the auxiliary match targets to the substrate. In yet another variant, the additional substrate 72 could be provided with sets of marks similar to those provided on the surface 40 of principal substrate 38, and the play could be conducted on that substrate. The instructional cards provided to the teacher may suggest additive uses for the game pieces such as addition, subtraction, multiplication, division and patterning (an instructional method used to teach the recognition of formations). For example, the teacher may be instructed to prepare cards on which are written simple mathematical equations or color or letter phrases of various levels of difficulty. The child then uses the manipulatives 20 to work through the mathematical equations or match the colors of the game pieces to the color or letter phrases. These activities may be conducted on the second (unmarked) face of substrate 38. As these and other variants may be employed without departing from the invention, the foregoing description of the preferred embodiments should be taken by way of illustration rather than by way of limitation of the present invention as defined by the claims.

I claim:

1. (a) An educational aid for teaching number concepts to children comprising a plurality of groups of game pieces, each said group including a different number of game pieces, said game pieces having indicia, the game pieces in each said group having the same indicia, the game pieces in different groups having different indicia;
    (b) a substrate defining a plurality of matching target areas, each said matching target area on said substrate consisting of non-numeric indicia denoting a number equal to the number of game pieces in a corresponding group; and
    (c) a plurality of auxiliary matching targets, each said auxiliary matching target corresponding to one of said groups, each said auxiliary matching target piece having indicia thereon denoting a number equal to the number of game pieces in the corresponding group and corresponding to the number denoted by the non-numeric indicia on a respective one of said plurality of matching target areas on said substrate, said game pieces, said auxiliary target pieces and said substrate being constructed and arranged so that said game pieces may be positioned on aid auxiliary matching targets, and so that said auxiliary matching targets may be positioned on said matching target areas of said substrate.

2. An educational aid as claimed in claim 1 wherein said matching target areas of said substrate are arranged on said substrate in numerical order according to the number of pieces in the corresponding group of game pieces, whereby said indicia on said matching target areas are positioned on said substrate in numerical order according to the numbers denoted by such indicia.

3. An educational aid as claimed in claim 1 wherein said indicia on each said auxiliary matching target include a plurality of different indicia at differing levels of abstraction.

4. An educational aid as claimed in claim 1 wherein said indicia on each said auxiliary matching target include a set of marks equal in number to the number of game pieces in the corresponding group of same pieces and also include a numeral denoting the number of pieces in such group.

5. An educational aid as claimed in claim 1 wherein said substrate includes a first surface, said matching target areas being areas of said surface, whereby said game pieces, said auxiliary target pieces or both may be positioned on said matching target areas when said first surface is exposed.

6. An educational aid as claimed in claim 5 wherein said substrate includes a second surface devoid of indicia denoting the numbers of game pieces in said groups.

7. An educational aid as claimed in claim 1 further comprising means for reasonably attaching said game pieces to said auxiliary matching targets.

8. An educational aid as claimed in claim 7 wherein said means for attaching said game pieces to said auxiliary target pieces are operative to attach said game pieces to said auxiliary matching targets so that said game pieces do not obscure said symbols on said auxiliary matching targets.

9. An educational aid as claimed in claim 1 wherein said indicia on said game pieces includes colors, said game pieces in each said group being the same color, so that a different color is associated with each group of game pieces, game pieces in different groups being of different colors.

10. An educational aid as claimed in claim 1 further comprising an additional matching target displaying the colors associated with said groups in an ordered array wherein the order of the colors associated with said groups of game pieces corresponds to the numerical order of the numbers of pieces in said groups of game pieces.

11. The educational aid of claim 1 wherein said at least one matching target includes a substrate having a plurality of said matching target areas.

12. The educational aid of claim 11 wherein said at least one matching target further includes a plurality of auxiliary matching targets, each of said plurality of auxiliary matching targets defining a matching target area and having thereon indicia corresponding to only one of said groups of game pieces.

13. An educational aid as claimed in claim 11 wherein said plurality of matching target areas on said substrate are arranged in an order corresponding to the numerical order of the number of pieces in the associated groups of game pieces.

14. (a) An educational aid for teaching number concepts to children comprising a plurality of groups of game pieces, each said group including a different number of game pieces, said game pieces having indicia, the game pieces in each said group having the same indicia, the game pieces in different groups having different indicia;
    (b) a substrate defining a plurality of matching target areas, each said matching target area on said substrate having indicia denoting a number equal to the number of game pieces in a corresponding group; and
    (c) a plurality of auxiliary matching targets, each said auxiliary matching target corresponding to one of said groups, each said auxiliary matching target piece having indicia thereon, said indicia including a set of marks equal in number to the number of game pieces in the corresponding group of game pieces and also including a numeral denoting the number of pieces in such group, wherein each of said auxiliary matching target includes means for selectively either displaying the set of marks thereon while concealing the numeral thereon or displaying a numeral thereon while concealing the set of marks thereon.

15. An educational aid as claimed in claim 14 wherein each said auxiliary matching target has a first side and a second side, the set of marks on each such auxiliary matching target piece being disposed on the first side, the numeral being disposed on the second side.

16. An educational aid comprising:
    (a) a plurality of groups of game pieces, each said group including a different number of game pieces, each of said game pieces having indicia, the game pieces within each one of said groups having similar indicia; and
    (b) at least one matching target defining a plurality of matching target areas, each said matching target area being associated with one of said groups of game pieces, each said matching target area having indicia, said indicia on said matching target areas consisting of nonnumeric indicia at plural differing levels of abstraction, said game pieces and said at least one matching target being constructed and arranged so that said game pieces can be positioned on said matching target areas.

17. The educational aid of claim 16 wherein said indicia of said at least one matching target areas include sets of marks, the number of marks of each such set corresponding to the number of game pieces in said associated group of game pieces.

18. The educational aid of claim 16 wherein said indicia of said plurality of game pieces includes differing colors, the game pieces in each said group being the same color, the game pieces in different groups being of different colors.

19. The educational aid of claim 18 wherein said indicia of said at least one matching target area include differing colors corresponding to said colors of said game pieces.

20. An educational method for teaching numerical concepts to children comprising the steps of:
(a) providing a plurality of groups of game pieces, each said group including a different number of game pieces, said game pieces in each such group having similar indicia, game pieces in different groups having different indicia; and
(b) conducting a series of successive matching operations in which a child matches the groups of game pieces to a plurality of matching target areas on at least one substrate so that in said successive matching operations the chile must examine different indicia on said matching target areas and employ progressively higher levels of abstract reasoning to associate the correct group with the correct matching target area, wherein said successive matching operations include a first matching operation in which the child matches game pieces of different groups to different matching target areas according to the colors of the game pieces and matching target areas and a second matching operation in which the child matches the number of game pieces in each group to the number of marks in a set of marks on each matching target area, and wherein the chile is not exposed to the number of marks of the second matching operation until the child has finished the first matching operation.

21. A method as claimed in claim 20 wherein said successive matching operations include a third matching operation in which the child matches the number of game pieces in each group of game pieces to the number denoted by a numeral on each matching target area wherein the child is not exposed to the numeral of the third matching operation until the child has finished employing the level of abstract reasoning required in the second matching operation.

22. An educational method for teaching numerical concepts to children including the steps of:
(a) providing a plurality of groups of game pieces, there being different numbers of game pieces in each group;
(b) conducting a first matching operation wherein a child matches the different groups of game pieces to separate auxiliary matching targets according to indicia on the auxiliary matching targets denoting the numbers of game pieces in the various groups; and
(c) conducting a second matching operation wherein the child matches the auxiliary matching targets with matching target areas on a substrate according to non-numeric indicia on the substrate denoting numbers.

23. An educational method according to claim 22 wherein said first matching operation is conducted so that the child attaches the game pieces in each group to the auxiliary matching target matched to that group, and wherein said second matching operation is conducted with said game pieces attached to said auxiliary matching targets.

24. An educational method for teaching numerical concepts to children comprising the steps of:
(a) providing a plurality of groups of game pieces, each said group including a different number of game pieces, said game pieces in each such group having similar indicia, said game pieces in different groups having different indicia;
(b) conducting a first matching operation wherein a child matches the different groups of game pieces to separate auxiliary matching targets, each said auxiliary matching target corresponding to one of said groups and having a first and a second side, wherein the first side includes a set of marks equal in number to the number of game pieces in the corresponding group and wherein the second side includes a numeral denoting the number of pieces in such group, said first matching operation being conducted so that the child matches each group of game pieces to the first side of a corresponding auxiliary matching target having a set of marks equal in number to the number of game pieces in the group of game pieces, wherein the numerals on the second sides of the auxiliary matching targets are not visible to the child during the first matching operation.

25. An educational method according to claim 24 further comprising the step of conducting a further matching operation after completion of the first matching operation wherein the child matches the different groups of game pieces to a numeral displayed on the second side of a corresponding auxiliary matching target, wherein the set of marks on the first side of the auxiliary matching target is not visible to the child conducting the further matching operation.

26. An educational method according to claim 24 comprising the additional step of matching the sets of marks on the first side of the auxiliary matching targets with matching target areas on a substrate according to non-numeric indicia on the matching target areas of the substrate denoting numbers in a further matching operation wherein the numerals on the second side of the auxiliary matching targets are concealed during said further matching operation.

27. An educational method according to claim 24 comprising the additional step of conducting a further matching operation wherein the child matches the numerals on the second sides of the auxiliary matching targets with matching target areas on a substrate according to non-numeric indicia on the substrate denote numbers, wherein the sets of marks on the first sides of the auxiliary matching targets are not visible to the child during such further matching operation so that the child is forced to match the numerals on the auxiliary matching targets to the non-numeric indicia on the substrate.

* * * * *

UNITED STATES PATENT AND TRADEMARK OFFICE
CERTIFICATE OF CORRECTION

PATENT NO. : 5,167,505
DATED      : December 1, 1992
INVENTOR(S) : Bonnie J. Walsh It is certified that error appears in the above-identified patent and that said Letters Patent is hereby corrected as shown below:

On the Title page, and col. 1, line 2, in the title "AIDES" should read --AIDS.
    Column 9, line 27, "aid" should read --said--.
    Column 10, line 66, "nonnumeric" should read --non-numeric--.
    Column 11, line 28, "chile" should read --child--.
    Column 11, line 41, "chile" should read --child--.

Signed and Sealed this

Ninth Day of November, 1993

Attest:

BRUCE LEHMAN

Attesting Officer    Commissioner of Patents and Trademarks